United States Patent [19]

Okumura et al.

[11] 4,411,226

[45] Oct. 25, 1983

[54] INTAKE SYSTEM FOR AN INTERNAL COMBUSTION ENGINE

[76] Inventors: Takeshi Okumura, 122-1 Momozono; Kiyoshi Nakanishi, 1321, Mishuku, both of Susono-shi, Shizuoka-ken; Tokuta Inoue, 257-10, Senmaibara, Icchoda, Mishima-shi, Shizuoka-ken, all of Japan

[21] Appl. No.: 292,886

[22] Filed: Aug. 14, 1981

[30] Foreign Application Priority Data

Oct. 17, 1980 [JP] Japan ................................ 55-144439

[51] Int. Cl.³ ................................................ F01L 3/06
[52] U.S. Cl. .................................. 123/188 M; 123/308
[58] Field of Search .................... 123/188 M, 308, 432

[56] References Cited

U.S. PATENT DOCUMENTS

| | | | |
|---|---|---|---|
| 3,418,981 | 12/1968 | Von Seggern et al. | ............ 123/432 |
| 4,271,795 | 6/1981 | Nakagawa et al. | ............ 123/188 M |
| 4,300,500 | 11/1981 | Motosugi et al. | ................... 123/432 |
| 4,303,046 | 12/1981 | Nakanishi et al. | ............. 123/188 M |
| 4,304,211 | 12/1981 | Tezuka et al. | ....................... 123/432 |

FOREIGN PATENT DOCUMENTS 2063361  6/1981  United Kingdom ................ 123/432

*Primary Examiner*—Craig R. Feinberg
*Assistant Examiner*—W. R. Wolfe
*Attorney, Agent, or Firm*—Parkhurst & Oliff

[57] ABSTRACT

A helical type intake port for an internal combustion engine. The system has a first sub-intake passageway and a second sub-intake passageway. The first sub-intake passageway is connected to a helical end of the intake passageway for generating a flow of air for suppression of the swirl effect in the helical end. The second sub-intake passageway is connected to a portion of the helical port located upstream of the helical end portion, for increasing the speed of flow of air directed to the helical end portion.

4 Claims, 3 Drawing Figures

INTAKE SYSTEM FOR AN INTERNAL COMBUSTION ENGINE

FIELD OF THE INVENTION

The present invention relates to an intake system for an internal combustion engine of a type having intake ports of a helical shape.

BACKGROUND OF THE INVENTION

In a helical intake port, a strong swirl effect is incompatible with a high intake efficiency. If an intake port of such a helical arrangement is used, capable of effecting a strong swirl effect for obtaining a stable operation during a low rotational speed condition of the engine, the intake efficiency becomes small during the high rotational speed condition of the engine, so that a large output of power cannot be produced. In addition, a strong swirl effect during the high rotational speed causes an excessive increase in the speed of the flow around the spark plugs, causing the mixture to become difficult to ignite. When the swirl effect is decreased to obtain a high power during the high rotational speed of the engine, combustion during the low rotational speed becomes unstable.

SUMMARY OF THE INVENTION

An object of the present invention is to provide an intake system of an internal combustion engine having intake ports of a helical type, capable of obtaining a high intake efficiency during the high rotational speed of the engine while maintaining a high swirl effect during the low rotational speed of the engine.

According to the present invention an intake system for an internal combustion engine is provided, comprising:

a main intake passageway having helical shaped ends opened to respective combustion chambers of the engine;

a first sub-intake passageway having ends, each of which is connected to the respective helical shaped end at a first portion where the flow of the fluid from the first sub-intake passageway assist to increase intake efficiency of the flow of fluid introduced from the main passageway to the respective combustion chambers;

a second sub-intake passageway having ends, each of which is connected to the respective helical shaped end at a second position where the flow of fluid from the second sub-intake passageway assists to increase the effect of a swirl introduced from the main passageway to the respective combustion chamber, and;

change-over means responsive to operating conditions of the engine for selectively introducing fluid into the first sub-intake passageway or the second sub-intake passageway, thereby obtaining an idealized operation of the engine at every operating condition.

BRIEF DESCRIPTION OF THE ATTACHED DRAWINGS

DETAILED DESCRIPTION OF THE ATTACHED DRAWINGS

Figure 1:
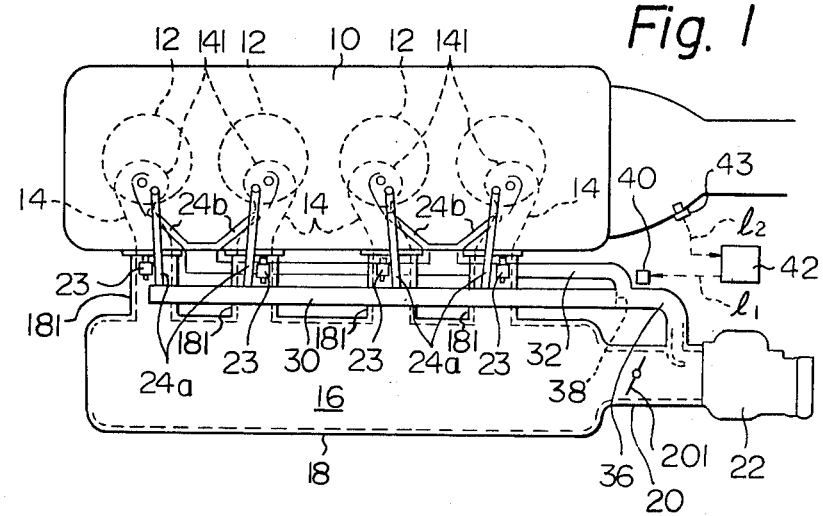
FIG. 1 illustrates an internal combustion engine provided with an intake system according to the present invention.

FIG. 1 shows a multi-cylinder internal combustion engine of an electric control fuel injection type, provided with an engine body 10 having combustion chambers. A surge tank 18 is connected to the engine body, which tank has branch pipes 181 connected to the respective combustion chambers 12. A throttle body 20 is connected to the surge tank, in which body a throttle valve 201 is arranged. An air flow meter 22 is arranged upstream of the throttle valve 201. The engine body 10 is provided with intake ports 14 of a so-called helical type, each of which ports 14 has an inlet portion 140 connected to the corresponding branch pipe 181 of the surge tank 18, and a helical outlet portion 141 opened to the respective combustion chamber 12. Fuel injector valves 23 are arranged adjacent to the respective intake ports 14, so that the flow of injected air from the injector valves are directed to the intake ports 14.

According to the present invention, in addition to the main intake passageway comprised by the throttle body 20 and the surge tank 18, a first sub-intake passageway and a second sub-intake passageway are provided. The first sub-intake passageway, indicated by a reference numeral 30, is provided with branch portions 24a connected to the respective intake ports 14. The second sub-intake passageway 32 is provided with branch portions 24b connected to the respective intake ports 14.

Figure 2:
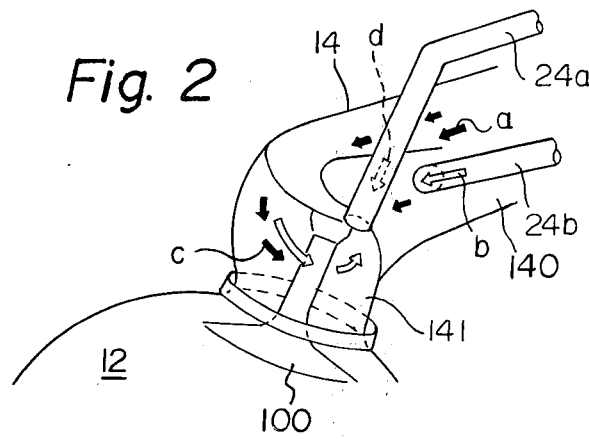
FIG. 2 is a diagrammatical perspective view showing a helical port of the present invention.

As shown by FIG. 2, which schematically and perspectively illustrates one of the intake ports 14, each of the branch passageways 24a of the first sub-intake passageway 30 is connected to the helical outlet portion 141 of the intake port, so that the branch portion 24a is opened to the inner upper wall of the intake port 14. Each of the branch passageways 24b of the second sub-intake passageway 32 is connected to the inlet portion 140 of the intake port located upstream of the helical outlet portion 141.

As shown by FIG. 1, the first and the second sub-intake passageways 30 and 32, respectively, are, at ends spaced from the branch passageways 24a and 24b, connected to one end of a common pipe 36. The other end of the common pipe 36 is connected to the main intake passageway at a position located between the air flow meter 22 and the throttle valve 201. A change-over valve 38 is arranged at a position where the first and the second sub-intake passageways are connected with each other, so that the common pipe 36 is, in accordance with the position of the change-over valve 38, selectively connected to the first sub-intake passageway 30 or to the second sub-intake passageway 32. An actuator 40 is provided for operating the change-over valve 38. The actuator 40 is connected to a control circuit 42 via a line $l_1$. The control circuit 42 receives a signal from a sensor for detection of the operational conditions of the engine. For example, an engine rotational speed sensor 43 is connected to the control circuit 42 via an electrical line.

Now the operation of the above-mentioned construction will be described.

Figure 3:
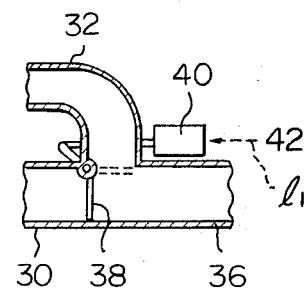
FIG. 3 is a sectional view of a portion of a change-over valve in FIG. 1.

When the engine is under an operating condition where the rotational speed of the engine or the load of the engine is low, the control circuit 42 responsive to the signal from the rotational speed sensor 43 issues an electric signal introduced to the actuator 40 so that the change-over valve 38 takes the position as shown by the solid line in FIG. 3, whereby the common pipe 36 is connected to the second sub-intake passageway 24b. As a result of this, the flow of air, as shown by an arrow b in FIG. 2, from the second sub-intake passageway 24b is at the portion 140 added to the flow of air in the intake port 14, as shown by arrows a. Since the speed of flow, as shown by the arrow b, is higher than the speed of flow as shown by the arrow a in the intake port 14, the speed of the air introduced into the helical outlet portion 141 is increased. Thus, a strong swirl motion of air introduced into the combustion chamber 12 as shown, by an arrow c, is obtained. Thus, effective combustion is attained at a low rotational speed condition.

When the engine is under an operating condition where the rotational speed or the load of the engine is high, the control circuit 42 issues an electric signal introduced into the actuator 40 for moving the valve 38, as shown by a dotted line in FIG. 3, whereby the common pipe 36 is connected to the first sub-intake passageway 30. As a result of this, the flow of air in the branch portion 24a of the first sub-intake passageway 30, as shown by an arrow d in FIG. 2, is introduced into the helical outlet portion 141 from above. Since the flow d is introduced transversely to the swirl motion of the air in the helical outlet portion 141, the swirl effect is decreased. Thus, the flow of air is quickly introduced into the combustion chamber 12, so that a high intake efficiency is obtained.

According to the present invention, the first sub-intake passageway 30 or the second sub-intake passageway 32 can be alternately used in accordance with the operating conditions of the engine. Thus, a strong swirl is obtained during a low rotational speed, while a high intake efficiency is maintained during the high rotational speed of the engine.

While the present invention is described with reference to a specific embodiment in the attached drawings, many modifications and changes may be made by those skilled in this art, without departing from the scope of the invention.

We claim:

1. An intake system for an internal combustion engine, comprising:

a main intake passageway having helical shaped ends opened to respective combustion chambers of the engine, each of the helical shaped ends comprising an inlet portion of a straight tube shape for receipt of flow and an outlet portion of a helical shape for discharge of flow;

a first sub-intake passageway having ends, at least one end of which is connected to the outlet portion of the respective helical shaped end so that the flow of fluid from the first sub-intake passageway assists to increase the intake efficiency of the flow of fluid introduced from the main passageway to the respective combustion chambers;

a second sub-intake passageway having ends, each of which is connected to the inlet portion of the respective helical shaped end so that the flow of fluid from the second sub-intake passageway assists to increase the effect of a swirl introduced from the main passageway to the respective combustion chamber; and change-over means responsive to operating conditions of the engine for selectively introducing fluid into the first sub-intake passageway or the second sub-intake passageway.

2. A system according to claim 1, wherein said engine is of an electronic fuel injection type having an air flow meter arranged in the main intake passageway and a throttle valve arranged downstream of the air flow meter, and wherein both the first sub-intake passageway and the second sub-intake passageways are adapted for receiving the flow of fluid from the main passageway at a position between the air flow meter and the throttle valve.

3. A system according to claim 2, wherein said change-over means comprises a common pipe, for connecting the main passageway to the first sub-intake passageway and to the second sub-intake passageway, a change-over valve capable of being moved between a first position, where the common pipe is connected to the first sub-intake passageway and a second position where the common pipe is connected to the second sub-intake passageway, and a drive means responsive to the operating conditions of the engine for selectively moving the change-over valve between the first position and the second position.

4. A system according to claim 3, wherein said drive means comprises an actuator connected to the change-over valve, an operating unit for operating the actuator and a sensor means for detecting operating conditions of the engine.

* * * * *

UNITED STATES PATENT AND TRADEMARK OFFICE
CERTIFICATE OF CORRECTION

PATENT NO. : 4,411,226
DATED : October 25, 1983
INVENTOR(S) : OKUMURA, et al.

It is certified that error appears in the above—identified patent and that said Letters Patent is hereby corrected as shown below:

On the cover, above "Appl. No.: 292,886" insert

--Assignee: TOYOTA JIDOSHA KABUSHIKI KAISHA,

Toyota, Japan --.

Signed and Sealed this

Fourteenth Day of August 1984

[SEAL]

Attest:

GERALD J. MOSSINGHOFF

Attesting Officer

Commissioner of Patents and Trademarks